United States Patent
Soennichsen

(10) Patent No.: US 10,619,677 B2
(45) Date of Patent: Apr. 14, 2020

(54) CARDAN SHAFT

(71) Applicant: Danfoss Power Solutions ApS, Nordborg (DK)

(72) Inventor: Vagn Soennichsen, Nordborg (DK)

(73) Assignee: Danfoss Power Solutions ApS, Nordborg (DK)

(*) Notice: Subject to any disclaimer, the term of this patent is extended or adjusted under 35 U.S.C. 154(b) by 314 days.

(21) Appl. No.: 15/803,108

(22) Filed: Nov. 3, 2017

(65) Prior Publication Data

US 2018/0051752 A1 Feb. 22, 2018

Related U.S. Application Data

(63) Continuation-in-part of application No. 14/921,207, filed on Oct. 23, 2015, now abandoned.

(30) Foreign Application Priority Data

Nov. 20, 2014 (EP) .................................... 14194006

(51) Int. Cl.
| | | |
|---|---|---|
| *F16D 3/18* | (2006.01) | |
| *F04C 15/00* | (2006.01) | |
| *F04C 2/10* | (2006.01) | |

(52) U.S. Cl.
CPC .............. *F16D 3/185* (2013.01); *F04C 2/104* (2013.01); *F04C 15/0065* (2013.01); *F04C 2250/00* (2013.01); *Y10T 403/7035* (2015.01)

(58) Field of Classification Search
CPC ...... F16D 3/185; F04C 2/104; F04C 15/0065; F04C 2250/00; Y10T 403/7035
USPC ...... 464/156, 158, 159; 418/61.3; 403/359.6
See application file for complete search history.

(56) References Cited

U.S. PATENT DOCUMENTS

| | | |
|---|---|---|
| 4,087,215 A | 5/1978 | Miller |
| 4,474,544 A | 10/1984 | White, Jr. |
| 4,872,819 A | 10/1989 | White, Jr. |
| 5,061,160 A | 10/1991 | Kinder et al. |
| 6,203,439 B1 | 3/2001 | Tychsen et al. |
| 6,264,567 B1 | 7/2001 | Lyhne et al. |
| 7,156,628 B2 | 1/2007 | White et al. |

(Continued)

FOREIGN PATENT DOCUMENTS

| | | |
|---|---|---|
| DE | 19959836 A1 | 6/2001 |
| SU | 1291747 A1 | 2/1987 |

OTHER PUBLICATIONS

Indian First Examination Report for corresponding India Application No. 2899/DEL/2015 dated Mar. 26, 2019.

*Primary Examiner* — Greg Binda
(74) *Attorney, Agent, or Firm* — McCormick, Paulding & Huber PLLC

(57) ABSTRACT

A shaft (1) is shown comprising a shaft section (2) having an axis (3), a tooth geometry (4) at least at one end of said shaft section, said tooth geometry (4) having a first end (5) opposite said shaft section (2) and a second end (6) adjacent said shaft section (2), a number of teeth (7) distributed in circumferential direction around said axis (3), a bottom curve (9) between adjacent teeth (7), and an outer tooth curve (12), said bottom curve (9) having a positive slope from said first end (5) towards said shaft section (2) and a negative slope (14) at said second end (6). In such a shaft wear should be made as small as possible. To this end said bottom curve (9) comprises a section having a concave bottom curvature (15) between said positive slope and said negative slope.

14 Claims, 4 Drawing Sheets

(56) References Cited

U.S. PATENT DOCUMENTS

2004/0052670 A1    3/2004   Dong
2005/0271536 A1    12/2005   White et al.

CARDAN SHAFT

CROSS REFERENCE TO RELATED APPLICATION

This application is a continuation-in-part application of U.S. patent application Ser. No. 14/921,207 filed on Oct. 23, 2015, which claims foreign priority under U.S.C. § 119 from European Patent Application No. EP14194006 filed on Nov. 20, 2014, which are hereby incorporated by reference in their entirety.

TECHNICAL FIELD

The present invention relates to a shaft for a hydraulic machine, said shaft comprising a shaft section having an axis, a tooth geometry at least at one end of said shaft section, said tooth geometry having a first end opposite said shaft section and a second end adjacent said shaft section, a number of teeth distributed in circumferential direction around said axis, a bottom curve between adjacent teeth, and an outer tooth curve, said bottom curve having a rising slope from said first end towards said shaft section and a negative slope at said second end.

BACKGROUND

Examples of such a shaft can be found in U.S. Pat. No. 6,203,439 B1, U.S. Pat. No. 6,264,567 B1, or DE 199 59 836 A1.

Such a shaft is usually used as cardan shaft to transmit an orbiting and rotating movement of a first element of a hydraulic machine to a purely rotating movement of a second element of a hydraulic machine. An example for such a hydraulic machine is a hydraulic steering unit or a hydraulic gerotor motor.

Such a cardan shaft is often named "dog bone" because it has some similarities with a dog bone, i.e. a shaft section having a smaller diameter and two tooth geometries at both ends having a larger diameter.

As mentioned above, the cardan shaft is used to transmit an orbiting and rotating movement of a first element to a purely rotating movement of a second element. This requires that the cardan shaft must have the possibility to pivot with respect to both elements during one rotation. This pivoting movement is possible due to the form of the outer tooth curve and due to the form of the bottom curve having a rising slope from the outer end, i.e. from the end opposite said shaft section, in a direction towards the shaft section. In other words, the radius of the bottom curve increases starting from the outer end of the cardan shaft. The second end has a negative slope, i.e. the radius of the bottom curve is decreasing towards the shaft section.

When the cardan shaft is used in a hydraulic machine to transmit large torques the tooth geometry tends to wear.

SUMMARY

The object underlying the present invention is to keep wear as small as possible.

This object is solved with a shaft as described at the outset in that said bottom curve comprises a section having a concave bottom curvature between said positive slope and said negative slope.

Prior art cardan shafts have a bottom curve having a convex bottom curvature between said positive slope and said negative slope. In other words, the largest radius of the bottom curve is just at the contact point of the positive slope and the negative slope. According to the present invention this convex bottom curvature is changed to a concave bottom curvature, e.g. said concave bottom curvature forms a kind of indentation of said bottom curve. Although it is not necessary that said concave bottom curvature is in the form of a circle, it can be said in general terms that the radius of the concave bottom curvature has a center point radially outside said tooth geometry. The concave bottom curvature improves the tribological performance. It allows for a better lubrication in this area.

In a preferred embodiment said outer tooth curve runs in a direction parallel to said axis and has a positive slope from said first end towards said shaft section and a negative slope at said second end. This corresponds basically to the prior art tooth curve so that in this respect changes can be kept small.

Preferably said concave bottom curvature is located in an axial middle section of said tooth section. Therefore, the contact pressure in the axial middle of the tooth geometry is reduced.

Preferably a smallest radius of said bottom curve within said concave bottom curvature is larger than a smallest radius of said bottom curve axially outside said concave bottom curvature. The smallest radius can be, for example, at the outer end of the tooth geometry, i.e. at the end opposite said shaft section. The concave bottom curvature forms only a small indentation.

Preferably said concave bottom curvature is symmetric with respect to an axial middle. In the simplest form this means that the concave bottom curvature has the same axial length starting from the axial middle to the two ends of the tooth geometry. In a preferred embodiment the two branches starting from the axial middle of the concave bottom curvature have the same form.

Preferably each tooth has a thickness in said axial middle which is reduced with respect to a thickness of said tooth immediately outside said concave bottom curvature. This reduces the contact pressure in the region of the concave bottom curvature.

Preferably said outer tooth curve has a largest radius in said axial middle of said concave bottom curvature. This means that a section with positive slope can contact the section with negative slope.

In a preferred embodiment a distance between adjacent tooth bottoms at said axial middle is larger than a distance between adjacent tooth bottoms immediately outside said concave bottom curvature. The "valley" between two adjacent tooth bottoms becomes a bit broader in the region of the concave bottom curvature.

In a preferred embodiment each tooth comprises two tooth flanks in circumferential direction, said flanks being steeper in said axial middle than immediately outside said concave bottom curvature. This reduces the contact pressure as well.

Preferably said flanks comprise a concave flank curvature having the same axial position as said concave bottom curvature. This facilities the machining of the tooth geometry. When a tool is lowered into the part forming the basis of the cardan shaft this tool can remove material from the bottom of a space between two adjacent teeth forming the bottom curve and at the same time forming the flanks of the tooth.

BRIEF DESCRIPTION OF THE DRAWINGS

A preferred embodiment of the invention will now be described in more detail with reference to the drawing, wherein.

DETAILED DESCRIPTION

Figure 1:
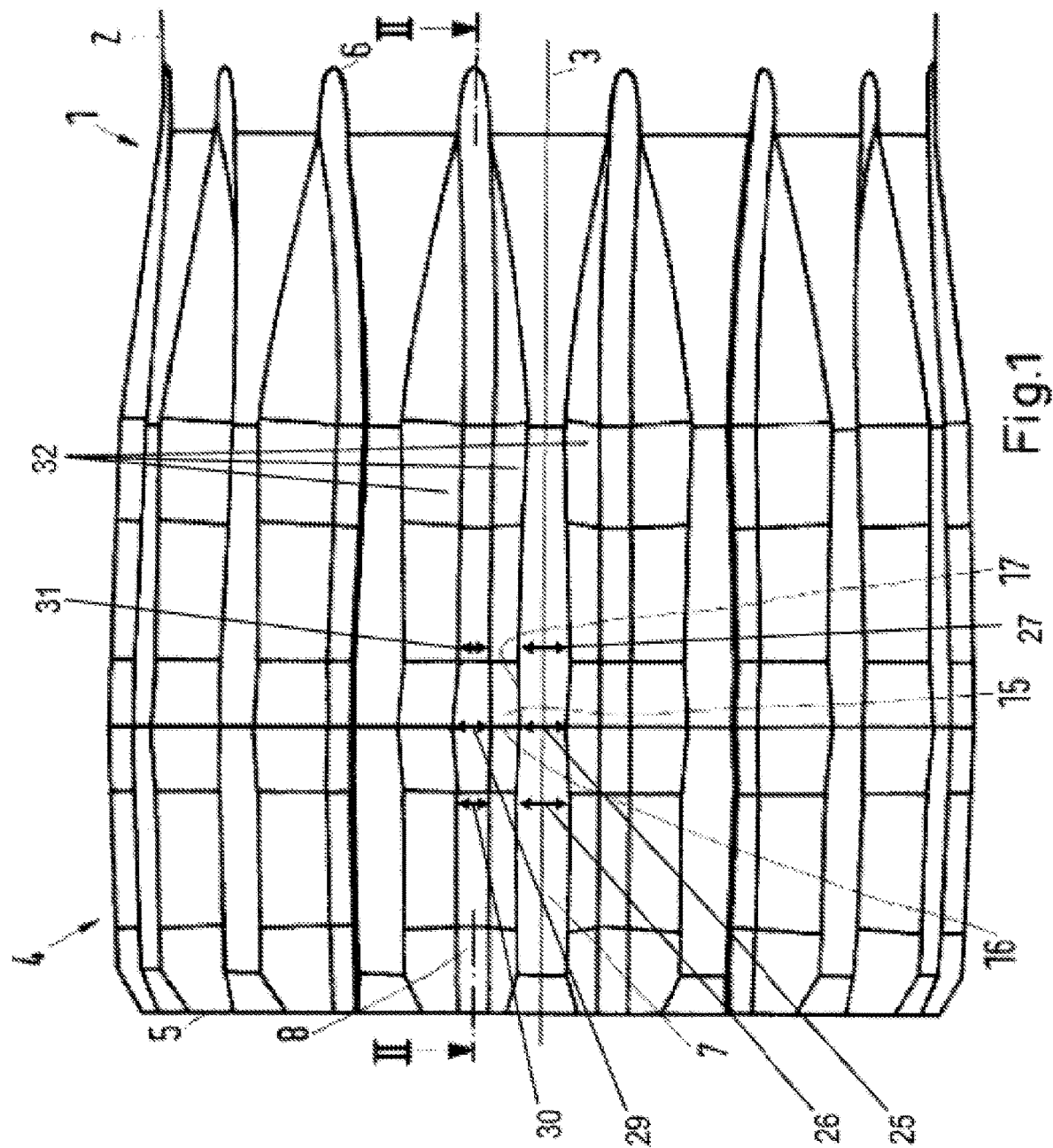
FIG. 1 is a schematic illustration of one end of a shaft.

FIG. 1 shows a shaft 1 used as a cardan shaft having a shaft section 2 which is shown only partly. The shaft section 2 comprises an axis 3 about which the cardan shaft 1 can rotate during operation. Furthermore, the cardan shaft 1 comprises a tooth geometry 4 at least at one end of the shaft section 2. In most cases, such a tooth geometry 4 is provided at both axial ends of the shaft section 2.

Such a shaft 1 can be used in a hydraulic machine 100, in the present case a motor. The machine 100 has a first displacing element 101 made as a gear cooperating with a second displacing element 102 made as a ring gear. For this purpose the gear 101 rotates while simultaneously orbiting around an axis, that is, center of the gear 101 performs a rotation around this axis. Said axis is at the same time the axis of an output shaft 103 with which the displacement element 101 is unrotatably connected via the shaft 1. Upon rotation of the displacement element 101 the shaft 1 must be able to perform a certain swiveled movement, that is, it must be articulately connected with the displacement element 101.

To be able to perform this swiveled movement, both axial ends of the shaft 1 have a tooth geometry 4 in form of an external toothing. The tooth geometry at one end of the shaft 1 engages a schematically shown internal toothing 104 of the displacement element 101 and the other tooth geometry 4 engages an internal toothing 105 on the output shaft 103.

The tooth geometry has a first end 5 at an end of the cardan shaft 1 remote from the shaft section 2 and a second end 6 adjacent said shaft section 2. A number of teeth 7 is distributed in circumferential direction around said axis 3.

A groove 8 is located between each neighboring teeth 7. This groove 8 has a bottom curve 9. The bottom curve 9 has a first section 10 starting at the first end 5 and having a positive slope 18 from said first end 5 towards said shaft section. Furthermore, said bottom curve 9 has a second section 11. The second section 11 has a negative slope 19 towards said shaft section 2. In other words, in the first section 10 the radius of the bottom curve 9 is increasing in a direction towards the shaft section 2 and in the second section the radius of the bottom curve 9 is decreasing in a direction towards said shaft section 2. Furthermore, said tooth geometry 4 has an outer tooth curve 12. The outer tooth curve 12 extends in a direction parallel to the axis 3 and has a first section 13 with a positive slope 20 from said first end 5 towards said shaft section 2 and a second section 14 having a negative slope 21 in a direction towards said second end 6.

Figure 2:
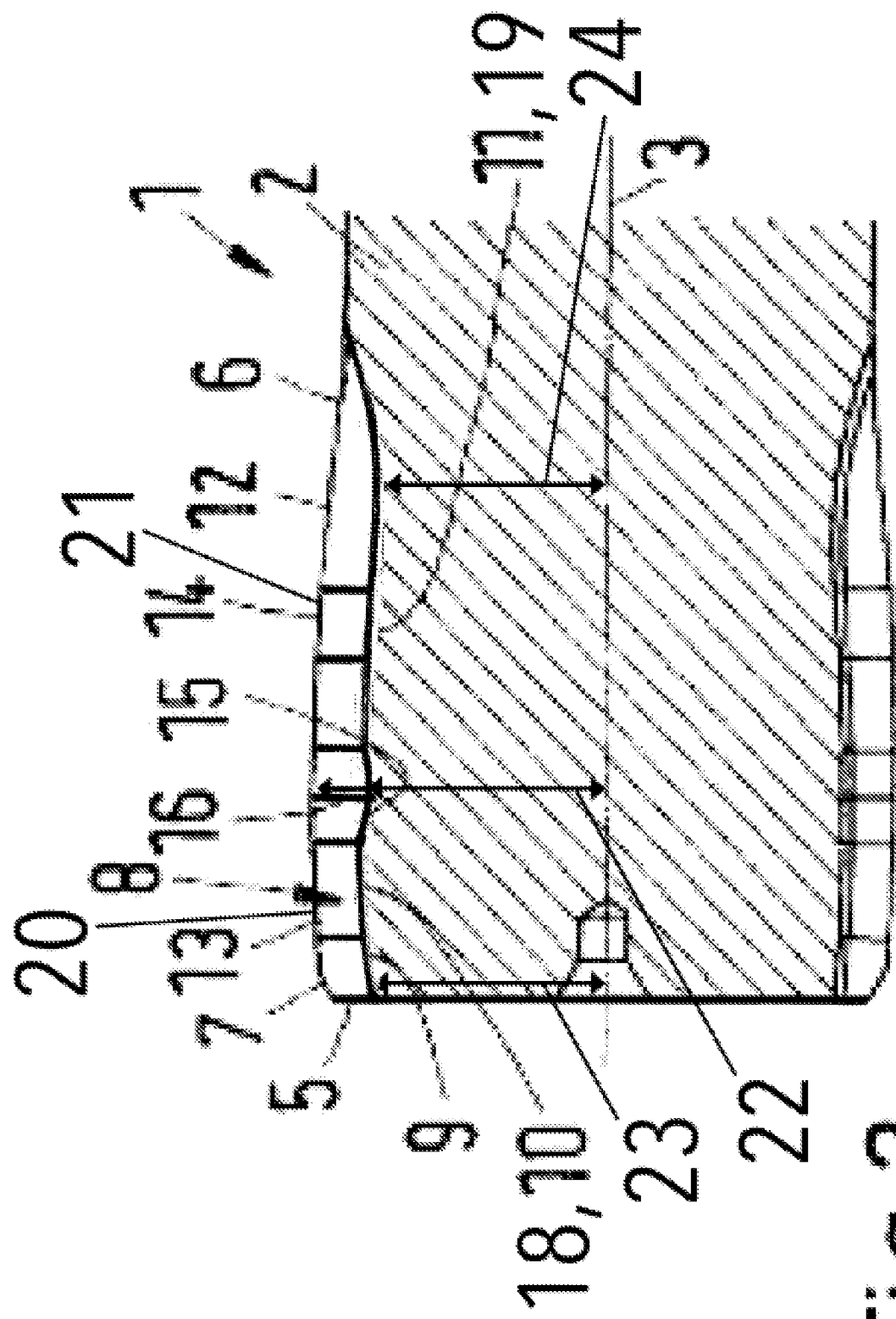
FIG. 2 is a section II-II of FIG. 1.
Figure 3:
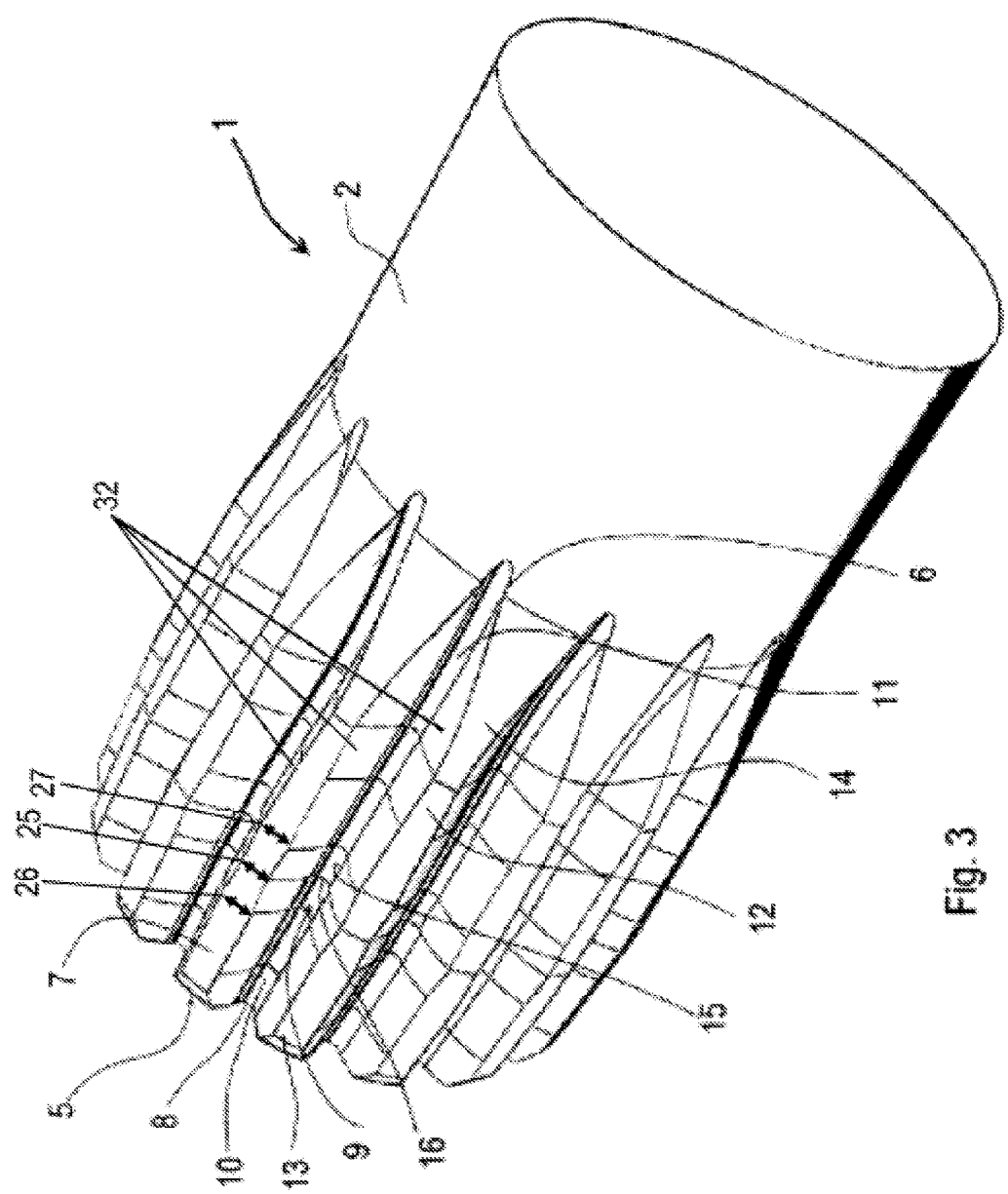
FIG. 3 is a perspective view of the end of the shaft according to FIG. 1.
Figure 4:
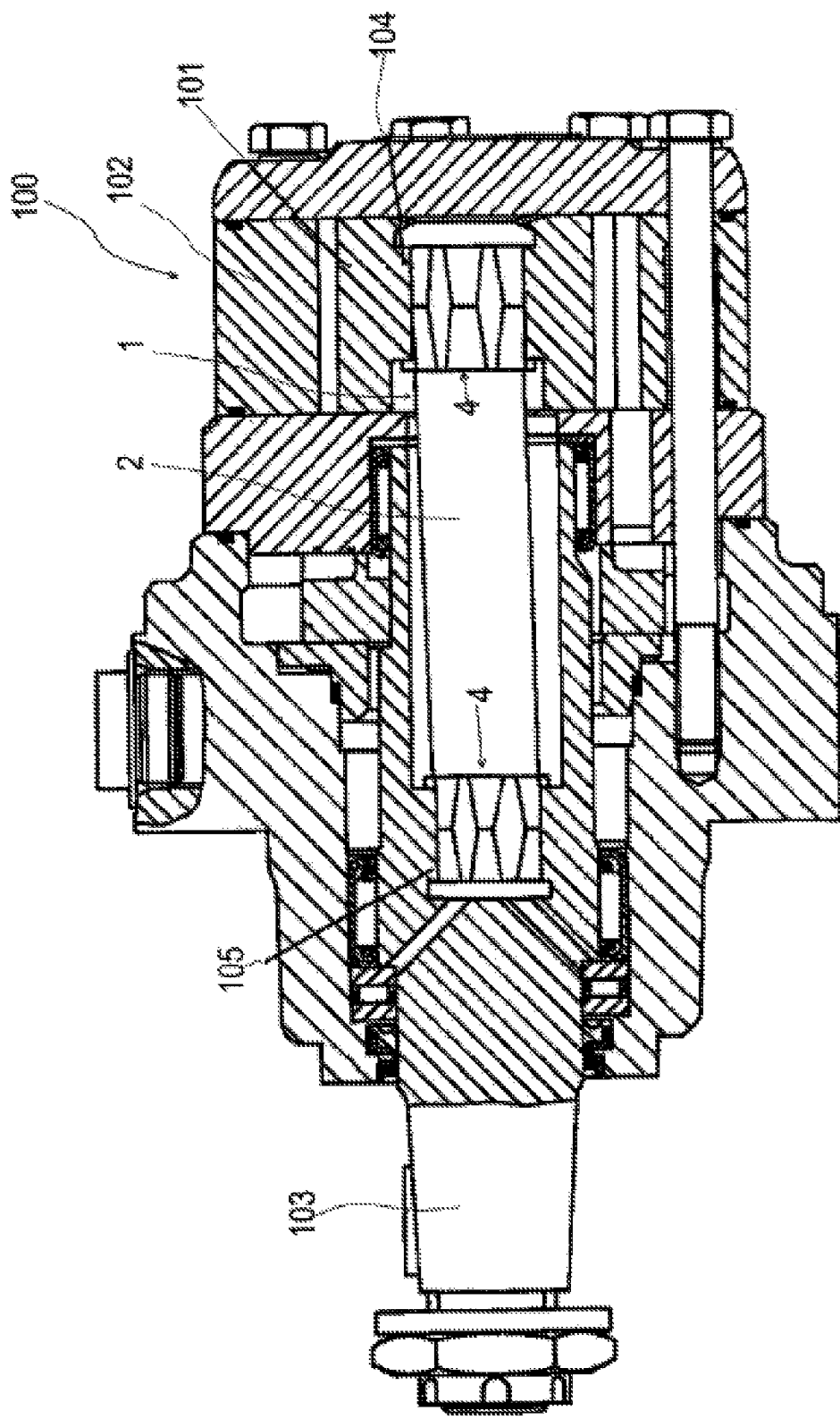
FIG. 4 shows an example of use of the shaft in a motor.

As can be seen in FIG. 2, the bottom curve 9 comprises a concave bottom curvature 15 which is located in an axial middle section of the tooth geometry 4. Although this concave bottom curvature 15 is not necessarily in form of a circle line, it can be said that a radius of this concave bottom curvature 15 would be located radially outside said tooth geometry 4.

The concave bottom curvature 15 has an axial middle 16. The concave bottom curve 15 has the smallest radius 22 at the axial middle 16 of the concave bottom curve 15. Basically, the bottom curve 9 at the concave bottom curvature 15 is symmetric with respect to its axial middle 16. This means that the two branches of the concave bottom curvature 15 extending from the axial middle 16 are at least of the same axial length. In a preferred embodiment they have the same form.

This smallest radius of the bottom curve 9 within said concave bottom curvature 15 is larger than a smallest radius 23, 24 of said bottom curve 9 axially outside said concave bottom curvature 15. The smallest radius 23, 24 of the bottom curve 9 can be at the first end 5 or at the second end 6.

As can be seen from FIG. 1, each tooth 7 has a thickness 25 in said axial middle 16 of said bottom curvature 15, which is reduced with respect to a thickness 26, 27 of said tooth 7 immediately outside said concave bottom curvature 15.

On the other hand, the outer tooth curve 12 has a largest radius 28 in said axial middle 16 of said concave bottom curvature 15.

As can be seen from FIG. 1 a distance 29 between the bottom edges the tooth flanks 32 of adjacent teeth at said axial middle 16 is larger than a distance 30,31 between the bottom edges the tooth flanks 32 of adjacent teeth immediately outside said concave bottom curvature 15.

Each tooth 7 comprises two tooth flanks in circumferential direction, said flanks being steeper in said axial middle 16 than immediately outside said concave bottom curvature 15. Furthermore, said flanks comprise a concave flank curvature 17 having the same axial position as said concave bottom curvature 15.

In this tooth geometry 4 the material of the teeth is removed in the region of the concave bottom curvature 15 to produce the convex bottom curvature. In order to facilitate the machining the distance between the tooth bottoms in circumferential direction is increased as well, however, only for a small amount.

The removal of material improves the tribological performance. It allows for a better lubrication in this area. Furthermore, it reduces the contact pressure in the axial middle 16 of the concave bottom curvature 15 which is located in the axial middle section of an active part of the tooth geometry 4.

The prior art tooth geometry can be termed as "crowning". This means that each tooth is wider in the axial middle part than at the axial ends. The present invention now makes a "double crowning" meaning that there is a thinner section in the thickened part between the two ends 5, 6 of each tooth 7.

This leads to the consequence that a permanent contact to the counterpart tooth in the center of the active part of the teeth 7 is avoided. Therefore, the contact area moves from one axial end 5 of the tooth 7 to the other axial end 6 of the tooth 7. In an area where is no contact the lubrication oil can reach this free area to form a lubrication oil film. There is no area in which there is a permanent pressure between the tooth 7 of the cardan shaft 1 and the tooth of a counter element.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A shaft comprising:
   a shaft section having an axis;
   a tooth geometry disposed at one end of said shaft section,
      said tooth geometry having a first end distally disposed with respect to said shaft section and a second end proximally disposed with respect to said shaft section; and a number of teeth in the tooth geometry that are distributed circumferentially around said axis;

wherein the tooth geometry includes a positive slope section, a negative slope section and an axial middle section, the negative slope section being disposed closer to the second end of the tooth geometry than the positive slope section, the axial middle section being disposed between the positive slope section and the negative slope section; and wherein each of the number of teeth has a thickness in the axial middle section that is reduced with respect to a thickness in the positive slope section and a thickness in the negative slope section.

2. The shaft according to claim 1, wherein each of the number of teeth includes an outer tooth curve that extends in a direction parallel to said axis and has a positive slope in the positive slope section in a direction from said first end toward said second end and a negative slope in the negative slope section in a direction from said first end toward said second end of said tooth geometry.

3. The shaft according to claim 2, wherein said outer tooth curve has a largest radius in said axial middle section of said tooth geometry.

4. The shaft according to claim 3, wherein a distance between adjacent tooth bottoms at said axial middle section is larger than a distance between adjacent tooth bottoms at said positive slope section and said negative slope section of said tooth geometry.

5. The shaft according to claim 2, wherein a concave bottom curvature is located in the axial middle section of said tooth geometry.

6. The shaft according to claim 5, wherein said concave bottom curvature is symmetric with respect to said axial middle section of said tooth geometry.

7. The shaft according to claim 2, wherein a smallest radius of said bottom curve in said axial middle section is larger than a smallest radius of said bottom curve in said positive slope section and said negative slope section of said tooth geometry.

8. The shaft according to claim 1, wherein the tooth geometry includes a bottom curve between adjacent teeth; and wherein the bottom curve has a positive slope in the positive slope section in a direction from said first end toward said second end, a negative slope in the negative slope section in a direction from said first end toward said second end, and a concave bottom curvature located in the axial middle section of said tooth geometry.

9. The shaft according to claim 8, wherein a smallest radius of said bottom curve in said axial middle section is larger than a smallest radius of said bottom curve in said positive slope section and said negative slope section of said tooth geometry.

10. The shaft according to claim 9, wherein said concave bottom curvature is symmetric with respect to said axial middle section of said tooth geometry.

11. The shaft according to claim 8, wherein said concave bottom curvature is symmetric with respect to said axial middle of said tooth geometry.

12. The shaft according to claim 11, wherein a distance between adjacent tooth bottoms at said axial middle section is larger than a distance between adjacent tooth bottoms at said positive slope section and said negative slope section of said tooth geometry.

13. The shaft according to claim 8, wherein said concave bottom curvature is symmetric with respect to said axial middle of said tooth geometry.

14. The shaft according to claim 1, wherein the shaft section is configured to rotate about said axis.

* * * * *

UNITED STATES PATENT AND TRADEMARK OFFICE
CERTIFICATE OF CORRECTION

PATENT NO. : 10,619,677 B2
APPLICATION NO. : 15/803108
DATED : April 14, 2020
INVENTOR(S) : Vagn Soennichsen Page 1 of 1

It is certified that error appears in the above-identified patent and that said Letters Patent is hereby corrected as shown below:

In the Specification

Column 6, Claim 11, Line 26, after "middle" please insert -- section --.

Signed and Sealed this
Eighth Day of September, 2020

Andrei Iancu
*Director of the United States Patent and Trademark Office*